United States Patent [19]

Yano et al.

[11] Patent Number: 4,681,154

[45] Date of Patent: Jul. 21, 1987

[54] HEAT ACCUMULATING MATERIAL ENCLOSING CONTAINER AND HEAT ACCUMULATING APPARATUS

[75] Inventors: Naomichi Yano; Hajime Ito; Shigeru Tanaka, all of Osaka, Japan

[73] Assignee: Kubota, Ltd., Osaka, Japan

[21] Appl. No.: 710,884

[22] Filed: Mar. 12, 1985

Related U.S. Application Data

[62] Division of Ser. No. 416,658, Sep. 10, 1982, Pat. No. 4,565,242.

[30] Foreign Application Priority Data

| Mar. 13, 1981 | [JP] | Japan | 56-36131 |
| Aug. 24, 1981 | [JP] | Japan | 56-125525 |
| Aug. 24, 1981 | [JP] | Japan | 56-133163 |
| Mar. 8, 1982 | [WO] | PCT Int'l Appl. | PCT/00063 |

[51] Int. Cl.[4] .................................. F28D 21/00
[52] U.S. Cl. .................................. 165/47; 165/10; 165/104.11; 47/17; 126/430; 126/436
[58] Field of Search ............. 165/10, 104.11, 47, 165/104.19, 159; 47/17; 126/430, 436

[56] References Cited

U.S. PATENT DOCUMENTS 3,324,942 6/1967 Miller .................................. 165/159
4,170,261 10/1979 Laing et al. ......................... 165/10
4,289,116 9/1981 Williams ............................. 126/436
4,313,420 2/1982 Poeschl ............................. 47/17

FOREIGN PATENT DOCUMENTS

| 122853 | 10/1976 | Japan. | |
| 46561 | 4/1977 | Japan | 165/10 |
| 25550 | 2/1979 | Japan | 165/10 |
| 70941 | 6/1979 | Japan. | |
| 84486 | 6/1980 | Japan | 165/10 |

Primary Examiner—Albert W. Davis, Jr.
Attorney, Agent, or Firm—Armstrong, Nikaido, Marmelstein & Kubovcik

[57] ABSTRACT

The present invention relates to a bag-like container, and a spherical container in which a latent heat accumulating material is enclosed, and a heat accumulating apparatus employing such containers. A heat accumulating mat material (A) is of a flat bag-like container divided into a plurality of sections, where a latent heat accumulating substance is enclosed. A spherical container (1A) has a heat transfer area enlarging portion of a recess (102), a groove (103). A solar heat accumulating greenhouse 2A has a radiator heat exchanging portion (2B, 2D), a heat accumulating tank 2C and a forced circulation liquid system.

8 Claims, 11 Drawing Figures

HEAT ACCUMULATING MATERIAL ENCLOSING CONTAINER AND HEAT ACCUMULATING APPARATUS

This application is a divisional of Ser. No. 416,658, filed Sept. 10, 1982, now U.S. Pat. No. 4,565,242 granted Jan. 21, 1986.

TECHNICAL FIELD

The present invention relates to a bag-like container, and a spherical container in which a latent heat accumulating material is enclosed, and at heat accumulating apparatus employing such containers.

BACKGROUND OF THE INVENTION

Conventionally, containers or vessels in which a latent heat accumulating material is enclosed for use in greenhouses, solar heat water heaters, etc. are presented in cylindrical, spherical or box-like configurations, and much labor and troublesome procedures have been required for installing these enclosing containers in a wide range of large areas. Meanwhile, as a result of various experiments carried out so far, it has been made clear that configurations of capsules for the cylindrical, spherical or box-like containers in which the latent heat accumulating material is enclosed, should desirably be those having a large surface area, and also a small thickness of the latent heat accumulating material (i.e. a distance from a heat conducting surface to a center of the container) so as to expedite heat transfer of the heat accumulating material accommodated therein. Accordingly, in the case of a container, for example, of a spherical shape, in order to reduce its diameter and yet, to maintain a predetermined amount of heat accumulation, it has been necessary to increase the number of capsules by that extent, thus resulting in increased cost and consequent high prices.

SUMMARY OF THE INVENTION

Accordingly, it is a primary object of the present invention to provide a heat accumulating medium enclosing bag-like container which can be easily and quickly installed by readily altering its size through cutting or external pressure according to the size of a heat receiving area, and a heat accumulating medium enclosing spherical container having a high heat accumulating efficiency, and also, a latent heat accumulating greenhouse, a water heater or the like utilizing solar heat, which is capable of saving fuel cost through employment of such containers.

It is to be noted that the present invention generally relates to a heat accumulating material enclosing container and a heat accumulating apparatus and more particularly, to improvements of heat accumulating mat materials, heat accumulating material capsules, solar heat accumulating greenhouses.

According to the present invention, there is provided a heat accumulating mat material as a heat accumulating material enclosing bag-like container in which the rectangular flat bag-like container of a flexible material is divided or partitioned into a plurality of sections through tape-like sealing portions extending in parallel relation with respect to the longitudinal side edges and lateral side edges of said container, while a latent heat accumulating substance is enclosed in each of said divided sections, with each of said sealing portions having a width sufficient to be cut without leakage of said substance. Therefore, the size of the mat can be readily and quickly altered for installation according to the size of the heat receiving surface.

Subsequently, in the heat accumulating material capsule of the present invention, a large number of heat transfer area enlarging portions are provided over the entire surface of a spherical main body, while the latent heat accumulating material is confined within the main body, with the heat transfer area enlarging portions being formed into recesses or grooves. By the above arrangement, the heat transfer area on the external surface of the capsule is enlarged, and the thickness of the latent heat accumulating material is reduced to provide a high heat transfer efficiency. Moreover, since the capsule may be formed with the recesses or grooves as the heat transfer area enlarging means during molding of said spherical main body, there is no cost-wise increase involved.

Meanwhile, in the solar heat accumulating greenhouse of the present invention, a radiator heat exchanging portion is provided at least at one side of upper or lower portion in the greenhouse, while a heat accumulating tank is disposed at a lower part in the greenhouse, with said radiator heat exchanging portion and said heat accumulating tank being connected to each other through a force circulation liquid system. The heat accumulating tank as described above is made of a heat insulating tank member, in which a container enclosing the phase transformation heat accumulating medium therein is incorporated, and in said tank member, there is formed a flow passage. To an upper portion at the upstream side of said flow passage, a heat collecting return pipe from a radiator heat collecting portion is connected, while, to a lower portion at the downstream side of said flow passage, a heat collecting supply pipe for said radiator heat collecting portion is coupled. Accordingly, it is so arranged that, during shining hours, solar heat is absorbed so as to be accumulated in the heat accumulating tank provided with the phase transformation substance, and the heat thus accumulated is discharged upon falling of the external atmospheric temperatures. Therefore, the temperature within the greenhouse may be maintained at a predetermined constant level, with a consequent reduction of expenses to a large extent through saving of fuel cost.

BEST MODES FOR EFFECTING THE PRESENT INVENTION

The present invention will be described in more detail hereinbelow with reference to the accompanying drawings.

In the first place, one preferred embodiment of a heat accumulating mat material according to the present invention will be explained by taking as an example, a plant culture mat to be disposed at root portions of plants within a greenhouse.

Figure 1:
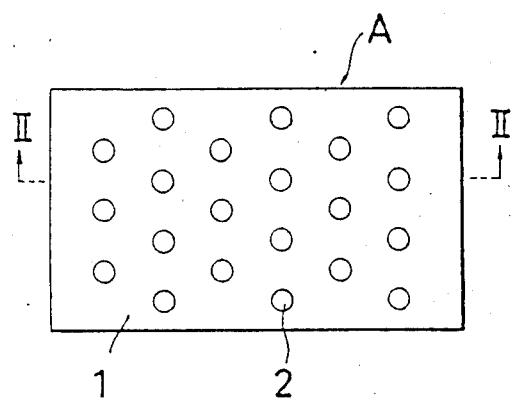
FIG. 1 is a top plan view of a heat accumulating mat material according to one preferred embodiment of the present invention.
Figure 2:
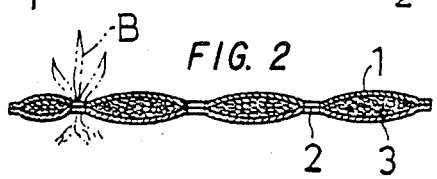
FIG. 2 is a cross section taken along the line II—II of FIG. 1, FIGS. 3 and 4 are top plan views respectively showing a second and a third embodiments according to the present invention.

Referring now to the drawings, there is shown, in FIGS. 1 and 2, a mat A in the form of a flat plate-like bag 1 made of a plastic film material, and the bag 1 is formed with a large number of circular holes 2 extending through the upper and lower surfaces thereof as shown. Each of the holes 2 is arranged to be of such a size as will not hinder the process of growth such as sowing, sprouting, rearing, root separation, etc. for a plant indicated at B. In the bag 1 described above, a phase transformation heat accumulating medium 3, for example, of $CaCl_2.6H_2O$ or the like is enclosed. $CaCl_2.6H_2O$ as described above produces reaction as follows at temperatures of 27° to 30° C.

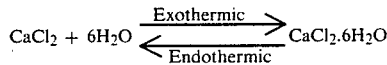

For use, the mat A is directly laid on the ground surface along the undulation of the ground surface for direct sowing through the holes 2 onto the ground surface or for planting seedlings therethrough.

The mat A subjected to solar heat during day time accumulates heat through endothermic decomposition upon rising of temperature of the hydrated compound as the heat medium up to 27° to 30° C. During night time or in rainy weather, when the temperature within a greenhouse or frame falls below 27° to 30° C., the decomposing substance within the mat A produces heat through chemical combination so as to suppress the temperature drop within the greenhouse and the frame, and simultaneously, to prevent radiation of terrestrial heat.

For the heat accumulating medium, following substances may be employed besides the above.

| Kind of medium | Melting temperature |
| --- | --- |
| $Na_2SO_4.10H_2O$ | approximately 32° C. |
| $Na_2SO_3.5H_2O$ | approximately 48° C. |
| Paraffin | approximately 46° C. |

Figure 3:
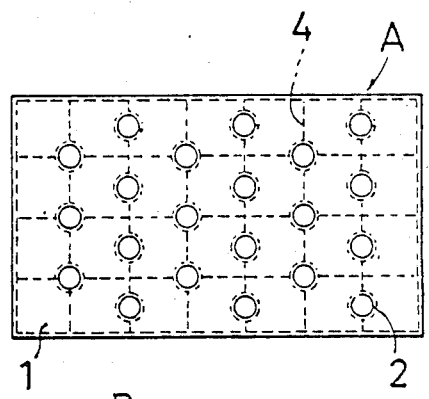

In FIG. 3, there is shown a culture mat according to a second embodiment of the present invention, which is partitioned into a check-like pattern by heat seals 4 to prevent the medium 3 within the main body A from moving in the bag.

Figure 4:
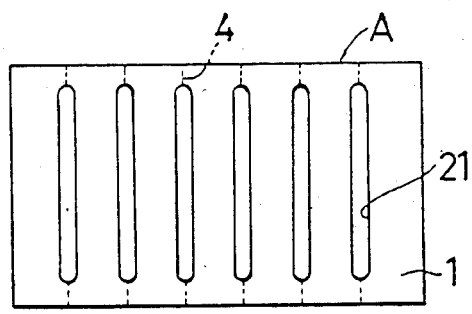

Meanwhile, FIG. 4 shows a third embodiment in which the circular holes 2 in the foregoing embodiments are replaced by elongated openings 21 arranged in the parallel relation to each other.

The plant B grows through such through-holes 2 and 21, and since said holes are each set to such a size as will not obstruct the growth of the plant, water may be absorbed into the earth during water sprinkling.

It should be noted here that the through-holes as described above may be in a square or elliptic shape besides the circular hole and elongated hole described as employed in the foregoing embodiments, and that the number, density and positions of the holes may be properly determined according to the kinds of plants to be cultured.

Figure 5:
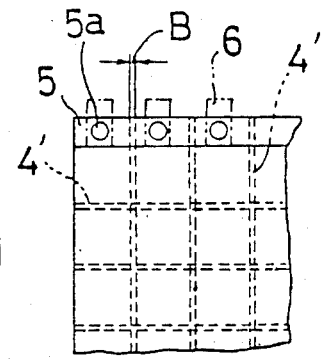
FIG. 5 is a fragmentary top plan view showing a fourth embodiment according to the present invention.

Reference is made to FIG. 5 further showing another embodiment, in which the seal portions 4' are in the form of tapes extending in parallel relation with respect to the longitudinal side edges and lateral side edges of a rectangular flat bag-like container, and each of said seal portions 4' has a width B sufficient to be cut without leakage of the substance contained inside. It is to be noted here that each of the seal portions 4' may be provided with a cutting off groove along its central line in a direction of its length so as to be readily cut without any cutting tool, and also that seal portions 5 may be provided along the longitudinal side edge and/or lateral side edge to form holes 5a therein for hanging on a wall or the like, or tongue pieces 6 may be alternatively provided on such side edges.

The mat material according to the present invention has many more applications other than the above, and, for example, may be suspended by hanging from an inner face of a north side wall of the greenhouse, or stretched across an attic of a dwelling house via suspending rods extended through the holes 2 described earlier, or stretched within a wall, etc. Furthermore, by hanging the mat material between an outer wall material and an inner wall material of a dwelling house through the holes of said mat or by holding the mat material between the inner wall material and the outer wall material, heat insulating effect for the dwelling house can be obtained.

Subsequently, a heat accumulating material capsule of an improved type will be explained.

Figure 6:
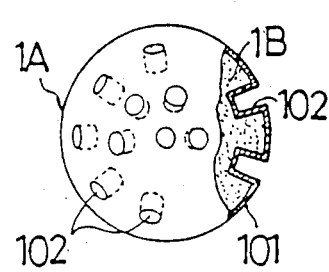
FIG. 6 is a front elevational view, partly broken away, of a heat accumulating material capsule according to one preferred embodiment of the present invention.

In FIG. 6, a capsule 1A is formed with a large number of recesses 102 over the entire surface of the spherical main body 101 as a heat transfer area enlarging means. These recesses 102 are formed in the same depth so as to direct towards the center of the main body 101 in the embodiment, but are not necessarily limited to the center-oriented direction and the same depth. The main body 101 of the capsule 1A made of a high density polyethylene is enclosed therein with a latent heat accumulating material 1B such as $CaCl_2.6H_2O$, etc.

Owing to the arrangements as described above, the capsule 1A is increased in its surface area, while the contact area between the heat exchanging medium such as water forming the surrounding atmosphere and the latent heat accumulating material 1B is increased, with simultaneous reduction of thickness of the heat accumulating member, and improvement of the heat transfer efficiency. Furthermore, even when some of the recesses 102 are blocked through contact thereof with neighboring capsules, remaining recesses still serve for improvement of the heat transfer efficiency.

Figure 7:
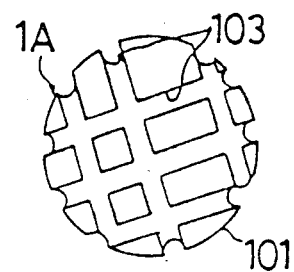
FIG. 7 is a front elevational view according to another embodiment of the present invention.

In FIG. 7 showing another embodiment according to the present invention, a plurality of rows of grooves 103 are formed in the outer periphery of the spherical main body 101 in parallel relation or in a crossed state. Similar to the previous embodiment, by the grooves 103 of such configuration also, the surface area is increased, and the improvement of heat transfer efficiency may of course be expected, with a reduction of the distance between the heat conducting surface at the bottom portions of the grooves 103 and the center of the spherical main body 101, while, even when the capsule 1A is brought into contact with a neighboring capsule, heat exchange at a high efficiency is effected at all times, since the heat exchange medium flows through the grooves 103.

Figure 8:
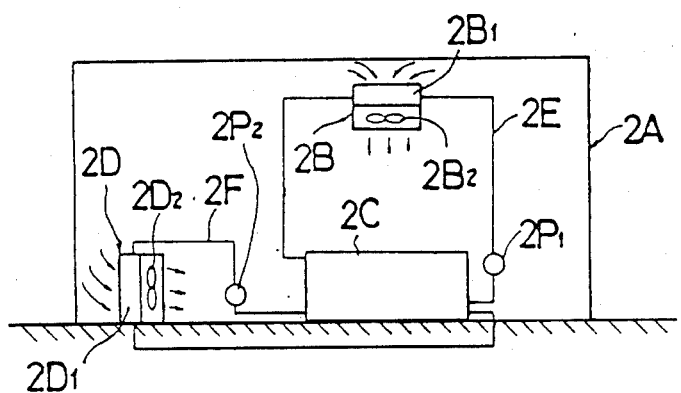
FIG. 8 is a schematic front elevational layout diagram showing a solar heat accumulating greenhouse according to one preferred embodiment of the present invention.

On the other hand, the solar heat accumulating greenhouse has a construction as follows. In FIG. 8, generally at the central upper portion of the greenhouse 2A, there is provided a radiator heat collecting portion 2B which includes a radiator $2B_1$ provided with fins around a water passing pipe and having an air lead-in port directed upward, and a fan $2B_2$ disposed below said radiator $2B_1$. There is also provided a radiator heat radiating section 2D having the construction similar to that of the radiator heat collecting portion 2B, and disposed, with an air lead-in port of a radiator $2D_1$ directed towards the side wall of the greenhouse, and a fan $2D_2$ directed towards the interior of said greenhouse.

Figure 9:
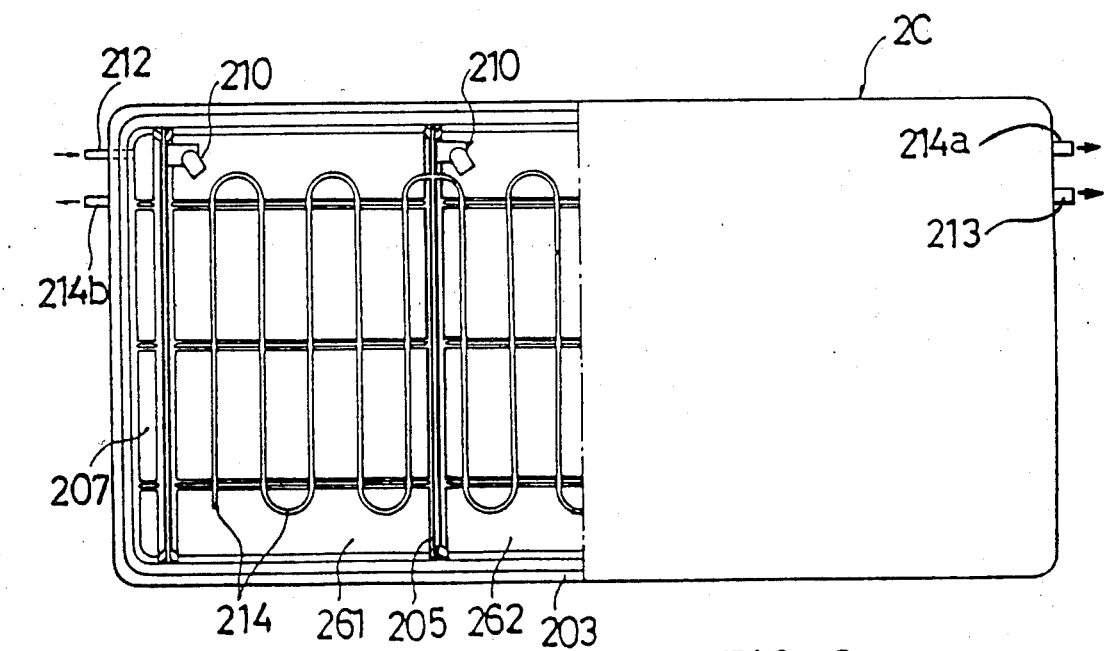
FIG. 9 is a top plan view, partly broken away, of a heat accumulating tank.
Figure 10:
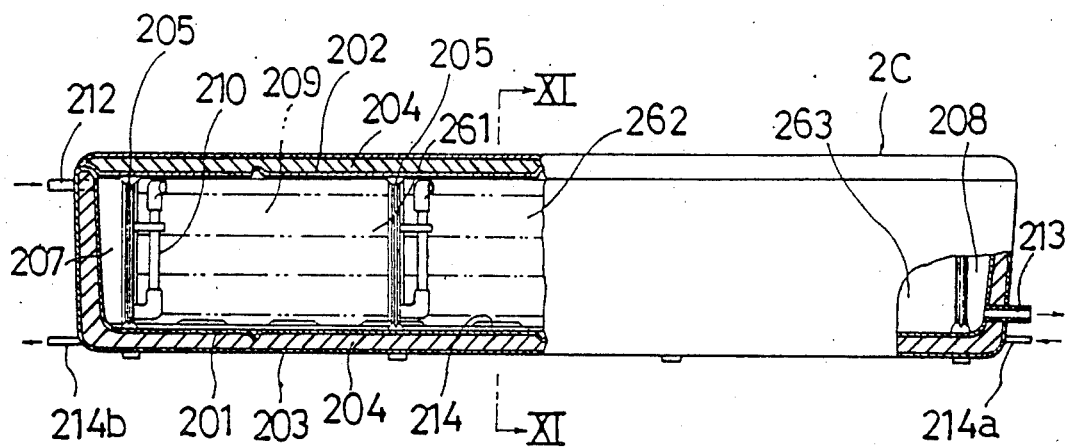
FIG. 10 is a front elevational view, partly broken away, of the heat accumulating tank.
Figure 11:
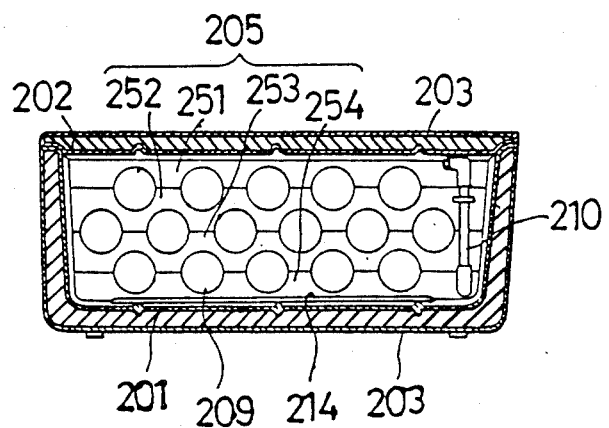
FIG. 11 is a cross section taken along the line X—X in FIG. 10.

Further provided is a heat accumulating tank 2C which is a latent heat accumulating tank. As shown in FIGS. 9 through 11, the tank 2C includes a container 201 of a synthetic resin (referred to as a tank body hereinbelow) covered by a heat insulating material 204 such as expanded polystyrene or the like, a tank body cover 203 made of a corrosion-resistance metal and further applied over the outer periphery of the tank body 201 covered with the heat insulating material 204, and a plurality of cylindrical containers 209 arranged in parrallel relation to each other and incorporated in said tank body 201. In the cylindrical containers 209, the phase transformation heat accumulating medium which produces exothermic and endothermic reactions through temperature radiations is enclosed, while water is filled in the tank body 201 so as to be formed into streams. The interior of the tank body 201 is divided, for example, into a plurality of sections 261, 262 and 263 at its intermediate portion along long sides thereof in the horizontal direction, by a plurality of vertical partition plates 205. Meanwhile, at the upstream side and downstream side along the water streams for said sections, the uppermost stream section 207 and the lowermost stream section 208 are formed. The cylindrical containers 209 are arranged along the direction of the long sides of the tank body 201 to extend through the partition plates 205, with the upper and lower stages being disposed under a horizontal state in a zigzag manner so as to be fixed. The partition plates 205 described above are each divided into upper and lower four sheets 251, 252, 253 and 254 by holding the cylindrical containers 209 therebetween. The respective sections are communicated to each other by communicating pipes 210 which are open towards the lower portions of the upstream side sections through the partition walls 205, and also open towards the upper portions of the downstream side sections so as to form flow passages for producing uniform streams in the respective sections. To the uppermost stream section 207 described earlier, a heat collecting return pipe 212 from the radiator heat collecting section 2B is connected at its upper part, while a heat radiating supply pipe 214b to the radiator heat radiating section 2D is connected at its lower portion. Meanwhile, to the lower-most stream side section 208, a heat collecting supply pipe 213 towards the radiator heat collecting section 2B and a heat radiating return pipe 214a from the radiator heat radiating section 2D are connected.

In each of the cylindrical containers 208, hydrated compound which produces the exothermic and endothermic reactions by temperature variations, for example, $CaCl_2.6H_2O$ is enclosed. When the temperature within the heat accumulating tank is raised by the hot water introduced from the radiator heat collecting section 2B and reaches over 38° C., $CaCl_2.6H_2O$ as referred to above becomes $CaCl_2 + 6H_2O$ to produce the endothermic reaction for the heat accumulation. Subsequently, upon falling of the water temperature below 38° C., $CaCl_2$ and water component are subjected to chemical combination to produce the exothermic reaction, thereby to suppress lowering of water temperature within the tank. At the bottom portion within the tank 2C, a heat exchanging pipe 214 made of a good heat conducting metal is disposed in a zigzag manner so as to extend through each of said sections, with the opposite ends thereof being respectively connected to said return pipe 214a and supply pipe 214b. Water to be heated is passed through the heat exchanging pipe 214.

A heat collecting forced circulation water system 2E is conncted to the heat collecting return pipe 212 and heat collecting supply pipe 213 through the radiator heat collecting section 2B described earlier, and is provided with a circulating pump $2P_1$ at the supply pipe side.

Meanwhile, a heat radiating forced circulation water supply 2F is connected to the heat radiating return pipe 214a and supply pipe 214b referred to earlier through the radiator heat collecting section 2D, and in the course at the side of the supply pipe 214b, a circulating pump $2P_2$ is connected. Part of the water pipe for the heat radiating force circulation water system 2F is buried in the ground within the greenhouse.

In the heat accumulating greenhouse 2A having the construction as described above, the state of operation thereof will be described hereinbelow.

As shown in FIG. 8, during day time, air within the greenhouse 2A is heated by the solar heat, and the air thus heated is drawn by the fan $2B_2$ of the radiator heat collecting section 2B to warm up the radiator $2B_1$ for heating water within the heat collecting forced circulating water system 2E. The water thus heated is fed to the heat collecting tank 2C for heat accumulation by the phase transformation heat accumulating medium in the cylindrical containers 209 within said tank 2C. Since the radiator heat collecting section 2B is positioned at the upper central portion where the room temperature is the highest, it has a high heat collecting efficiency.

Meanwhile, during night time or rainy weather, when the temperature within the greenhouse falls following lowering of the external atmospheric temperature, heat is discharged into the greenhouse by heat from the heat accumulating tank 2C, contrary to the above case, for heating. The radiation of heat as described above is mainly effected by the radiator heat radiating section 2D, but it may be so modified as to effect the heat radiating function by supplementarily employing the radiator heat collecting portion 2B at the same time.

Accordingly, owing to the fact that the radiator heat radiating portion 2D has a high heat radiating efficiency, since it is disposed at the lower portion of the greenhouse for diffusing warm air towards the central portion, and also that part of the water piping for the heat radiation forced circulating water system 2F is buried in the ground, the ground surface and the interior of the greenhouse are to be heated also from the underground.

The heat collecting side circulating pump $2P_1$ and heat collecting section fan $2B_2$ or heat radiating side circulating pump $2P_2$ and heat radiating section fan $2D_2$ are respectively arranged to be automatically started or stopped as in sets by the functioning of the thermostat provided within the greenhouse.

Upon falling of water temperature within the heat accumulating tank 2C below 38° C. due to heat radiation, the phase transformation heat accumulating medium in the cylindrical containers 209 causes the exothermic reaction so as to prevent water temperature for falling further. The heat accumulating tank is capable of maintaining the temperature within said tank above the set value at all times, and has such effects that it is provided with a large thermal capacity, and can be made compact in size.

For the phase transformation heat accumulating substance, $Na_2SO_4.10H_2O$, $Na_2SO_3.5H_2O$, and paraffin, etc. may be employed besides the substances described earlier. Moreover, in the heat collecting and heat radiating forced circulating fluid system referred to previously, anti-freezing solution such as ethylene glycol and the like, or fluids such as air, etc. may be employed instead of water. Furthermore, in the heat accumulating tank 4C, the spherical containers as described with reference to FIGS. 6 through 7 or containers of any other shapes may be accommodated instead of the cylindrical containers 209.

It is also to be noted that the heat radiating section 2D may be omitted so as to effect the heat radiating function by the heat collecting section 2B, and that, with the heat collecting section 2B abbreviated, warm air at the ceiling portion is led to the heat radiating section 2D through a duct for effecting the heat collecting function also thereat.

What is claimed is:

1. A solar heat accumulating greenhouse system, comprising:
    greenhouse space defining means enclosing a greenhouse space comprising a major volume of air for exchanging heat,
    a first heat transfer fluid medium circulating system provided in said greenhouse space and comprising piping means for circulating a first heat transfer fluid medium
    heat exchange means provided in an uppermost portion of said greenhouse space and coupled to said first heat transfer fluid medium circulating system for exchanging heat between said first heat transfer fluid medium and said major volume of air circulated within said greenhouse space, and
    heat accumulating means coupled to said first heat transfer fluid medium circulating system for exchanging heat between said first heat transfer fluid medium and said heat accumulating means for accumulating heat,
    said heat accumulating means comprising:
        heat insulating tank means coupled to said first heat transfer fluid medium circulating system for defining a heat insulated space for allowing a flow therethrough of said first heat transfer fluid medium,
        heat accumulating capsule means containing a phase transforming heat accumulating medium and provided in said heat insulating tank means in contact with said first heat transfer fluid medium for accumulating heat, and
        flow path defining means provided in said heat insulating tank means for defining a flow path generally extending in a horizontal direction and for causing a change in the flow direction of said first heat transfer fluid medium in upward and downward directions,
    said flow path defining means comprising
        partitioning means for partitioning the space in said heat insulating tank means into a plurality of compartments disposed in succession along the upstream to downstream direction of said flow of said first heat transfer fluid medium, and
        passage means for directing said flow of said first heat transfer fluid medium from the lower portion of an upstream compartment to the upper portion of the next adjacent downstream compartment; and wherein
    a portion of said piping means for flow of said first heat transfer fluid medium into said heat accumulating means is coupled to an upper portion of an upstream compartment, and a portion of said piping means for flow of said first heat transfer fluid medium out of said heat accumulating means is connected to a lower portion of a downstream compartment,
    said heat accumulating capsule means is adapted to extend through said partitioning means into a plurality of compartments and each said partitioning means is split into upper and lower partitioning means elements at a position where a heat accumulating capsule means extends therethrough.

2. A solar heat accumulating greenhouse system in accordance with claim 1, which has a heat collecting mode and a heat radiating mode, and wherein
    in said heat collecting mode
    said heat exchanging means is adapted to collect heat from said air in said greenhouse space to increase the temperature of said first heat transfer fluid medium, so that heat may be transferred to and accumulated by said heat accumulating means.

3. A solar heat accumulating greenhouse system in accordance with claim 2, wherein
    in said heat radiating mode
    said heat exchanging means is adapted to radiate heat to said air in said greenhouse space to decrease the temperature of said first heat transfer fluid medium, so that heat is transferred from said heat accumulating means.

4. A solar heat accumulating greenhouse system in accordance with claim 2, which further comprises
    heat radiating mode means for use in said heat radiating mode, said head radiating mode means comprising
    a second heat transfer fluid medium circulating system provided in said greenhouse space for circulating a second heat transfer fluid medium,
    heat radiating means coupled to said second heat transfer fluid medium circulating system for transferring heat from said second heat transfer fluid medium for radiation, and
    heat collecting means coupled to said second heat transfer fluid medium circulating system and thermally coupled to said heat accumulating means for exchanging heat between said first heat transfer fluid medium in said heat accumulating means and said second heat transfer fluid medium of said heat radiating mode means so as to absorb heat from said first heat transfer fluid medium in said heat accumulating means.

5. A solar heat accumulating greenhouse system in accordance with claim 4, wherein
said heat radiating means is provided in said greenhouse space.

6. A solar heat accumulating greenhouse system in accordance with claim 4, wherein
said heat radiating means is provided underground beneath said greenhouse space.

7. A solar heat accumulating greenhouse system in accordance with claim 4, wherein
said heat radiating means is provided both in said greenhouse space and underground beneath said greenhouse space.

8. A solar heat accumulating greenhouse system, comprising:
greenhouse space defining means enclosing a greenhouse space comprising a major volume of air for exchanging heat,
a first heat transfer fluid medium circulating system provided in said greenhouse space for circulating a first heat transfer fluid medium therethrough,
heat exchange means provided in an uppermost portion of said greenhouse space and coupled to said first heat transfer fluid medium circulating system for exchanging heat between said first heat transfer fluid medium and said major volume of air circulated within said greenhouse space, and
heat accumulating means coupled to said first heat transfer fluid medium circulating system for exchanging heat between said first heat transfer fluid medium and said heat accumulating means for accumulating heat,
said heat accumulating means comprising;
heat insulating tank means coupled to said first heat transfer fluid medium circulating system for defining a heat insulated space for allowing a flow therethrough of said first heat transfer fluid medium,
heat accumulating capsule means containing a phase transforming heat accumulating medium and provided in said heat insulating tank means in contact with said first heat transfer fluid medium for accumulating heat, and
flow path defining means provided in said heat insulating tank means for defining a flow path generally extending in a horizontal direction and for causing a change in the flow direction of said first heat transfer fluid medium in upward and downward directions;
said heat accumulating capsule means comprising a plurality of heat accumulating capsules each being a spherical body having a large number of heat transfer area enlarging portions provided over the entire surface thereof, said heat transfer enlarging portions comprising a plurality of first annular grooves parallel to each other and a plurality of second annular grooves parallel to each other and crossing said first grooves.

* * * * *

UNITED STATES PATENT AND TRADEMARK OFFICE
CERTIFICATE OF CORRECTION

PATENT NO. : 4,681,154

DATED : July 21, 1987

INVENTOR(S) : NAOMICHI YANO ET AL

It is certified that error appears in the above-identified patent and that said Letters Patent is hereby corrected as shown below:

On the cover page, Item [30], change "PCT/00063" to --- PCT/JP82/00063 ---.

Signed and Sealed this

Twenty-fourth Day of November, 1987

Attest:

DONALD J. QUIGG

Attesting Officer

Commissioner of Patents and Trademarks